Jan. 21, 1936. G. JOHNSON 2,028,705
COLLAR FASTENER
Filed Oct. 5, 1934
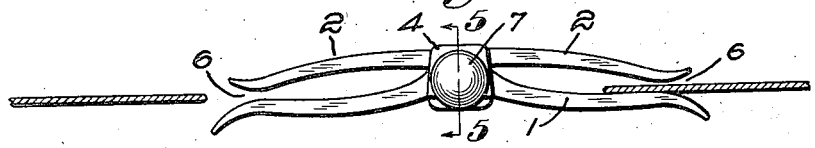
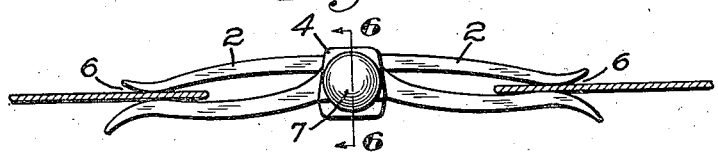
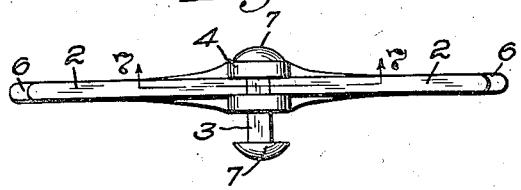
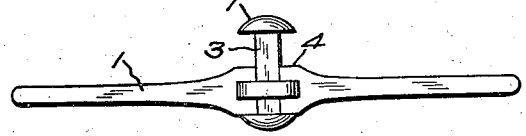
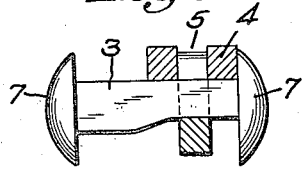
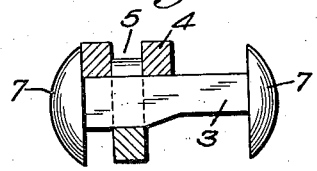
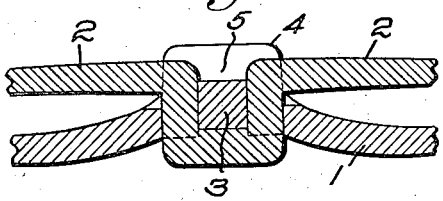
Inventor:
Gustav Johnson,
by Walter S. Jones
Atty.

Patented Jan. 21, 1936

2,028,705

UNITED STATES PATENT OFFICE 2,028,705

COLLAR FASTENER

Gustav Johnson, West Roxbury, Mass., assignor to United-Carr Fastener Corporation, Cambridge, Mass., a corporation of Massachusetts Application October 5, 1934, Serial No. 746,997

4 Claims. (Cl. 24—81)

My invention aims to provide improvements in collar fasteners and like clasps whose purpose is to hold two pieces of material in predetermined spaced relationship.

In the drawing, which illustrates a preferred form of my invention:—

Figure 1 is a side elevation of a preferred form of my invention with the jaws open previous to engagement of fabric;

Fig. 2 is a side elevation of the invention showing the jaws clamped upon the fabric;

Fig. 3 is a top plan view of the fastener shown in Figs. 1 and 2;

Fig. 4 is a bottom plan view of the fastener;

Fig. 5 is an enlarged section taken on the line 5—5 of Fig. 1, the locking pin being shown in unlocked position;

Fig. 6 is an enlarged section taken on the line 6—6 of Fig. 2, the locking pin being shown in locked position; and Fig. 7 is an enlarged section taken on the line 7—7 of Fig. 3.

The specific form of my invention as shown in the accompanying drawing presents a three-piece collar fastener of simple and sturdy design, easy to operate and not damaging to the collar.

The parts comprise a main bar part 1, forming a pair of oppositely extending arms, a cooperating bar 2 and a combination cam and connecting member 3. The bars 1 and 2 are slightly curved at their ends (Figs. 1 and 2) for the purpose of forming jaws easily adjustable on the collar. I have provided the bar 1 with a centrally located enlargement 4 and a slot 5. The parts of the bar 1 adjacent to the slot 5 are formed into U-shaped wings, parallel to each other and extending upwards from the bar. In other words, the bar 1 is humped in the center. The central portion of the bar 2 is also U-shaped, but the closed end of the U-shaped part extends in the opposite direction (Fig. 7). I have also made this second U-shaped portion of such a thickness that it fits snugly into the aperture 5 in the main bar (Fig. 4). The two U-shaped parts of the main bar 1 are substantially the same size as the U-shaped part of the bar 2. Thus when the parts are assembled no tipping motion of either part relative to the other will be possible. That is to say the distance between the jaws 6 will be variable but the arms 2—2 will always overlie the ends of the bar 1.

The pin 3 is assembled in the aperture formed by the oppositely extending U-shaped portions of the bars 1 and 2, as best shown in Figs. 5 and 6. It is longer than the width of the widest bar so that it may be pushed back and forth in the aperture, and, as shown in Figs. 5 and 6, it is thicker at one end than at the other. The uneven surfaces are joined by a cam face to facilitate the operation of the fastener. The ends of the pin are provided with heads 7 to prevent removal or loss of the pin from the slot.

When the pin 3 is in the position shown at Fig. 5, the jaws may be opened to insert the wings of a collar. When the pin is pushed into the position shown in Fig. 6 the U-shaped portions are forced apart and the jaws, at the same time are forced together.

Because of its adjustable jaws, my novel collar fastener is a great improvement over the ordinary spring type of fastener, since it may be slipped over the ends of the collar very easily and without wrinkling them. When the pin is moved to close the jaws the grip on the collar is firm and sure.

While I have illustrated and described a preferred form of my invention, I do not wish to be limited thereby as the scope of my invention is best defined by the following claims.

I claim:

1. A fastener of the class described comprising a pair of cooperating bars bent to form a pair of jaws at each end thereof, one of said bars having a U-shaped mid-portion, the second of said bars having an aperture to receive the U-shaped portion of said first bar, and a cam member assembled between the closed end of the U-shaped portion and the slotted bar, said cam member being adapted to act upon said bars to force each pair of jaws towards each other when moved in one direction and to release said jaws when moved in another direction.

2. A fastener of the class described comprising a pair of cooperating bars bent to form a pair of jaws at each end thereof, one of said bars having a relatively wide U-shaped mid-portion divided longitudinally by an elongated aperture, the other of said bars having a U-shaped mid-portion extending through the aperture in the first mentioned bar and cooperating with the U-shaped portion of the first-mentioned bar to form an additional aperture, an axially movable bar-connecting member assembled in said additional aperture and having a cam surface whereby when said member is moved in one direction each pair of jaws is forced together and when it is moved in the other direction the jaws are released.

3. A fastener of the class described comprising a pair of cooperating bars bent to form a pair of jaws at each end thereof, one of said bars underlying the other and having an elongated aperture, the other of said bars having a bent portion adapted to pass through said aperture thereby forming a second aperture, a connecting pin axially movable in said second aperture and being of greater thickness for part of its length than the other part whereby when the thicker part is forced into the aperture said jaws are brought together and when the thinner part is moved into the aperture the jaws are allowed to separate, and said pin having means on its ends to prevent removal thereof from said aperture.

4. A fastener of the class described comprising a pair of cooperating bars bent to form a pair of jaws at each end thereof, one of said bars having a relatively wide U-shaped mid-portion, said U-shaped mid-portion being divided longitudinally by an aperture in the form of a slot, the second of said bars having a relatively narrow U-shaped mid-portion adapted to enter said aperture, said thin U-shaped portion being located in said aperture and the closed end thereof extending in the opposite direction from the closed ends of the first-mentioned U-shaped portions thereby forming an additional aperture of variable size, a pin assembled in said variable aperture, one part of the length of said pin being of greater thickness in one dimension than the other part, said pin being slidable axially in said variable aperture and so proportioned that when the thicker end of the pin is forced into the aperture the closed ends of the U-shaped portions of the two bars will be forced apart thereby closing the jaws at the ends of said bars, and when the thinner part of the pin is moved into the aperture the tension of the jaws will be relaxed.

GUSTAV JOHNSON.